(12) United States Patent
Koops

(10) Patent No.: US 6,370,298 B2
(45) Date of Patent: *Apr. 9, 2002

(54) DEVICE FOR OPTICAL COUPLING OF A SOLID-STATE LASER WITH AN OPTICAL WAVE GUIDE AND A PROCESS FOR THEIR PRODUCTION

(75) Inventor: Hans Wilfried Koops, Ober-Ramstadt (DE)

(73) Assignee: Deutsche Telekom AG, Bonn (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/319,510
(22) PCT Filed: Nov. 25, 1997
(86) PCT No.: PCT/EP97/06566
§ 371 Date: Aug. 5, 1999
§ 102(e) Date: Aug. 5, 1999
(87) PCT Pub. No.: WO98/25170
PCT Pub. Date: Jun. 11, 1998

(30) Foreign Application Priority Data

Dec. 6, 1996 (DE) .......................... 196 50 696

(51) Int. Cl.⁷ ................................. G02B 6/32
(52) U.S. Cl. .................... 385/33; 385/35; 385/93; 372/101; 372/108
(58) Field of Search ................ 385/31, 33, 34, 385/35, 49, 88, 93; 372/101, 103, 108; 359/641, 642, 708, 711, 719

(56) References Cited

U.S. PATENT DOCUMENTS

| | | |
|---|---|---|
| 5,081,639 A | 1/1992 | Snyder et al. |
| 5,140,608 A | 8/1992 | Karpol et al. |
| 5,181,224 A | 1/1993 | Snyder ........................ 372/101 |
| 5,455,879 A * | 10/1995 | Modavis et al. .............. 385/33 |
| 5,790,576 A * | 8/1998 | Waarts et al. ................ 372/108 |
| 5,946,140 A * | 8/1999 | Huang ......................... 359/641 |
| 6,026,206 A * | 2/2000 | Gaebe ......................... 385/33 |

FOREIGN PATENT DOCUMENTS

| | | |
|---|---|---|
| DE | 39 19 484 | 10/1990 |
| DE | 195318595 | 8/1995 |
| EP | 0 484 276 | 5/1992 |

(List continued on next page.)

OTHER PUBLICATIONS

\*\*\*R. Zengele et al., "Fabrication of Optical Beamwidth Transformers for Guided Wave on InP Using Wedge–Shaped Tapers," J. Vac. Sci. Technol. B9(6), 1991, 3459.

\*\*\*Griebner et al., OSA Proceedings on Advanced Solid–State Lasers, 1995, vol. 24, 253.

\*\*\*Unger et al., "High Resolution Electron Beam Lithography for Fabricating Visible Semiconductor Lasers with Curved Mirrors and integrated Holograms," Microelectronic Eng. 23, 1994, 461.

(List continued on next page.)

Primary Examiner—Hemang Sanghavi
(74) Attorney, Agent, or Firm—Keynon & Kenyon

(57) ABSTRACT

In a device for optical coupling of a solid-state laser to an optical fiber, an anamorphic lens system is arranged between the output face of the solid-state laser and the input face of the optical fiber, the lens system converting differing apertures in the main sections of the solid-state laser into essentially identical apertures at the input face of the optical fiber. The lens system is composed of one anamorphic lens applied on the output face and a further lens applied on the input face.

14 Claims, 3 Drawing Sheets

FOREIGN PATENT DOCUMENTS

| | | |
|---|---|---|
| EP | 0 706 070 | 4/1996 |
| GB | 2 220 501 | 1/1990 |
| JP | 61-006889 | 1/1986 |
| JP | 63-100790 | 2/1988 |
| NL | 8600844 | 11/1997 |

OTHER PUBLICATIONS

\*\*\*Unger et al., "Fabrication of curved mirrors for visible semconductor lasers using electron–beam lithography and chemical assisted ion–beam etching," J. Vac. Sci. Technol., B. 11(6), 1993, 2514–2518.

\*\*\*Koops et al., "Evaluation of Dry Resist Viny–T8 and Its Application to Optical Microlenses,"Microelectronic Engineering 30, 1996, 539.

\*\*\*Koops et al., "High Resolution Electron Beam Induced Deposition,"J. Vac. Sci., Technol. B6(1), 1988, 477.

\*\*\*Koops et al., "Combined Lithographies for the Reduction of Stitching Errors in Lithography," Proc. EIPB94, J. Vac. Sci. Technol. B12 (6), 1994, 3265–3269.

\* cited by examiner

DEVICE FOR OPTICAL COUPLING OF A SOLID-STATE LASER WITH AN OPTICAL WAVE GUIDE AND A PROCESS FOR THEIR PRODUCTION

FIELD OF THE INVENTION

The invention relates to a device for the optical coupling of a solid-state laser to an optical fiber, an anamorphic lens system being arranged between the output face of the solid-state laser and the input face of the optical fiber and converting differing apertures in the main sections of the solid-state laser into essentially identical apertures at the input face of the optical fiber, and to a method for its manufacture.

For efficient coupling of laser light into optical fibers, particularly into single-mode optical fibers, it is necessary to achieve minimum-loss coupling of the optical fiber to the laser. This can be effected by lenses applied to the fiber end. In the case of solid-state lasers, it is also desirable to minimize to the greatest extent possible the loss of light caused by coupling the laser to the fiber. For this purpose, it has become known, for instance, from R. Zengerle, H. J. Bruckner, H. W. P. Koops, H.- J. Olzhausen, G. Zesch, A. Kohl and A. Menschig in "Fabrication of Optical Beamwidth Transformers for Guided Waves on InP Using Wedge-Shaped Tapers", J. Vac. Sci. Technol. B9(6), (1991) 3459, to use lithography to define and integrate a made-to-order coupling taper on the laser directly in the laser material. Such tapers, however, are only able to adapt the wave field to the phase in one section. Owing to the epitactic growth and the plane lithography used for the structuring, no adaptation is possible in the other section lying normal to the waveguide.

In addition, a device as set forth by the species defined in the Main Claim is known from U. Griebner, R. Grunwald, H. Schönnagel, OSA Proceedings on Advanced Solid-State Lasers, 1995, Vol. 24, 253, which, however, requires considerable expenditure for adjustments. Devices having in each case several lenses to be adjusted and fixed in position are also described in U.S. Pat. No. 5,140,608, British Patent Application No. GB 2 220 501 A, German Patent Application No. DE 39 19 484 A, European Patent Application No. EP 0 484 276 A, Dutch Patent Application No. NL 8600844 A and European Patent Application No. EP 0 706 070 A.

The object of the present invention is to propose a device for coupling a solid-state laser to an optical fiber, which permits substantially no-loss coupling and an adaptation of the wave fields in the direction of both main sections, and which can be manufactured with the necessary accuracy.

This objective is achieved according to the invention, in that the lens system is composed of one anamorphic lens applied on the output face and a further lens applied on the input face.

The device of the present invention has the advantage that in each case, the lenses can be applied on the output face and input face, respectively, with very high accuracy. An adjustment is then only necessary between the laser axis and the axis of the optical fiber. Both the anamorphic lens and the further lens can be advantageously manufactured using well-known processes.

It may be that an anamorphic lense on the input face is not ruled out in the device of the present invention, however, the further lens is preferably spherical. Moreover, this specific embodiment of the invention permits two designs, namely that the anamorphic lens applied on the output face of the laser is an elliptical lens, or is formed of two crossed, cylindrical partial lenses. The elliptical lens or at least one of the component lenses may be designed as a Fresnel lens.

The advantageous specific embodiment of the device according to the invention can further be designed in such a way that a spacer layer, corresponding to the magnification necessary in the direction of the larger aperture, is provided between the anamorphic lens and the output face.

Besides a real imaging of the output pupil of the laser, the device of the present invention makes it possible for the output pupils of the laser to form a virtual circular source image. This measure makes it possible to select a small distance between the lenses or between the output and input faces, accompanied by relatively great focal lengths of the lenses. The great focal lengths of the lenses, in turn, are more favorable for production using microtechnique methods.

Various well-known methods are suitable in principle, such as the definition of the cylinder lenses on the input face of the optical fiber with the aid of high-resolution electron-beam lithography and subsequent fabrication by reactive dry etching. Such a method is described, for instance, in "High Resolution Electron Beam Lithography for Fabricating Visible Semiconductor Lasers with Curved Mirrors and Integrated Holograms" by P. Unger, V. Boegli, P. Buchmann and R. Germann, Microelectronic Eng. 23, (1994) 461 and in "Fabrication of curved mirrors for visible semiconductor lasers using electron-beam lithography and chemical assisted ion-beam etching" by P. Unger, V. Boegli, P. Buchmann and R. Germann, J. Vac. Sci. Technol., B. 11(6) (1993) 2514–2518. Machining from resist lenses applied on the input or output face is also possible.

However, a particularly advantageous method for producing the device of the present invention is to define the lenses and/or spacer layers and/or antireflection layers with the aid of a dry-resist technique and to fabricate them with the aid of additive lithography, in particular, electron-beam lithography. This method represents a substantial improvement, especially if it is supported by computer programming.

The dry-resist technique, described, for example, in the German Patent 195 31 859.5 A1, makes available a method in which, using vapor deposition in high vacuum, the laser or the fiber end is covered with a defined layer thickness of a polymer which is sensitive to electrons. This polymer is cross-linked by the electron beam during the exposure to form a polymer which is rich in silicon oxide and whose refractive index is well-matched to that of the fiber material (n=1.48), see H. W. P. Koops, S. Babin, M. Weber, G. Dahm, A. Holopkin, M. Lyakhov, "Evaluation of Dry Resist Viny-T8 and Its Application to Optical Microlenses", Microelectronic Engineering 30 (1996), 539. A mirror composed of silicon oxide is applied by vapor deposition to the laser end, the refractive index of the lens material likewise being well-matched to that of the mirror. Thus, the insertion loss of these lenses manufactured from dry resist can theoretically be disregarded.

Using additive lithography with electron-beam-induced deposition, the lenses are directly constructed from precursor molecules, adsorbed from the vapor phase, by electron-beam polymerization and cross linking, using computer control of the beam and the dose, without any need for a previous coating or subsequent development of the structure. Such a method is described by H. W. P. Koops, R. Weiel, D. P. Kern and T. H. Baum in "High Resolution Electron Beam Induced Deposition", J. Vac. Sci., Technol. B 6(1), (1988), 477. However, the exposure time needed is very much greater compared to the resist technique, but remains within justifiable limits per lens.

In addition, by the use of the easily controllable electron beam in the scanning electron microscope, the placement of the exposure field relative to the fiber core and the effective zone of the laser is possible with an up to 100 nm precision, using image processing and scanning microscopy, which is described, for example, by H. W. P. Koops, J. Kretz, and M. Weber in "Combined Lithographies for the Reduction of Stitching Errors in Lithography", Proc. EIPB94, J. Vac. Sci. Technol. B 12 (6) (1994) 3265–3269. Due to the macrocontrol of the adjustment and the exposure, the exposure process can be automated, controlled by a program.

By the computer control of the exposure and the precalculation of the dose distribution according to measured gradation curves of the resist or deposition process, besides round, elliptical, spherical and hyperbolic lens combinations, lens combinations which are provided with a deviation prism and guide the laser beam so as to orient it can also be jointly realized and precisely adjusted in a refractive surface. The adjustment and the manufacturing process are combined in one, and are superior to conventional methods by at least one order of magnitude. At the same time, the easy controllability and image rotation during the electron-beam exposure represent a method for constructing the lenses which is superior, for example, to laser ablation. These procedures can be easily automated for productive use.

Exemplary embodiments of the invention are shown schematically in the Drawing with the aid of several Figures, and are explained more precisely in the following description.

Located in a plane 1 is an anamorphic plano-convex lens 2 with focal points $F_y$, and $-F_y$. The light output face of a solid-state laser, which is otherwise now shown, lies in plane 3. The source image is located at 4, a virtual magnified imagery of the source image resulting at 5.

Figure 1:
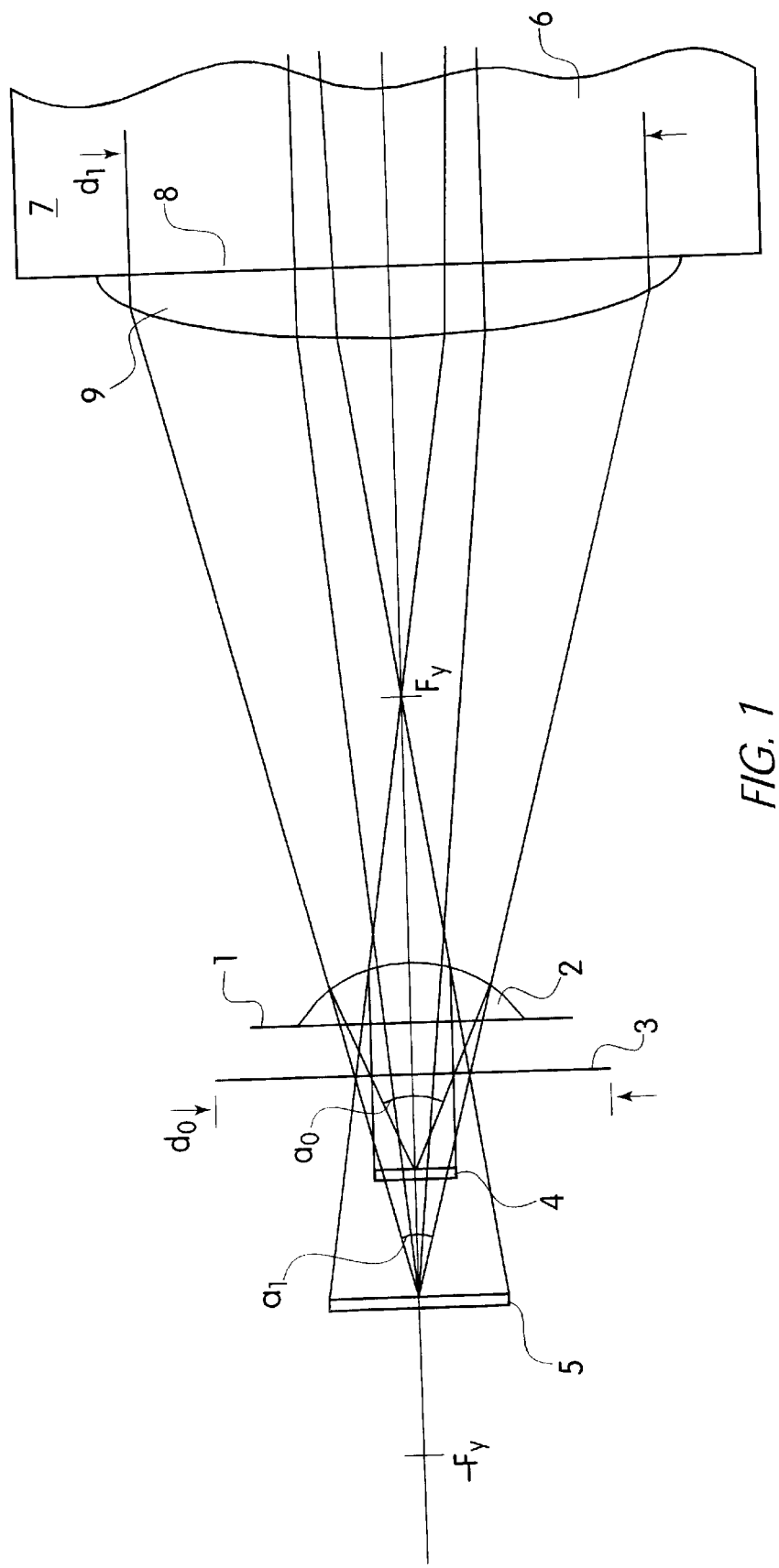
FIG. 1 shows an examplary embodiment in the y–z section.

Since in the y–z section (FIG. 1), the light emerging from output face 3 is virtually unfocussed, a large aperture is necessary to collect as large a portion of the total luminous flux a possible which, in the exemplary embodiment, is achieved by arranging a lens which is not too large as close as possible to output face 3 - namely, as close as possible for a virtual imagery.

The optical fiber, only partially indicated, is composed of an optically active core 6 and a cladding 7. Applied on light input face 8 is a spherical lens 9 which creates in core 6 a real image of virtual imagery 5.

For the sake of clarity, the schematic representation is not true to scale. The following dimensions are given as examples:
The focal length of the lens, and simultaneously the approximate thickness of a spacer layer between lens 2 and plane 3, is $\tau=1.43\,\mu m$, with a refractive index of anamorphic lens 2 of $n=2.75$ and a radius of $R=3.9\,\mu m$. The width of the output face is $d_0=0.3\,\mu m$, while the diameter of core 6 is $d_1=10\,\mu m$. The apertures are $a_0=45°$ and $a_1=10°$, the magnification is $V=14=B/g=20/f$.

Figure 2:
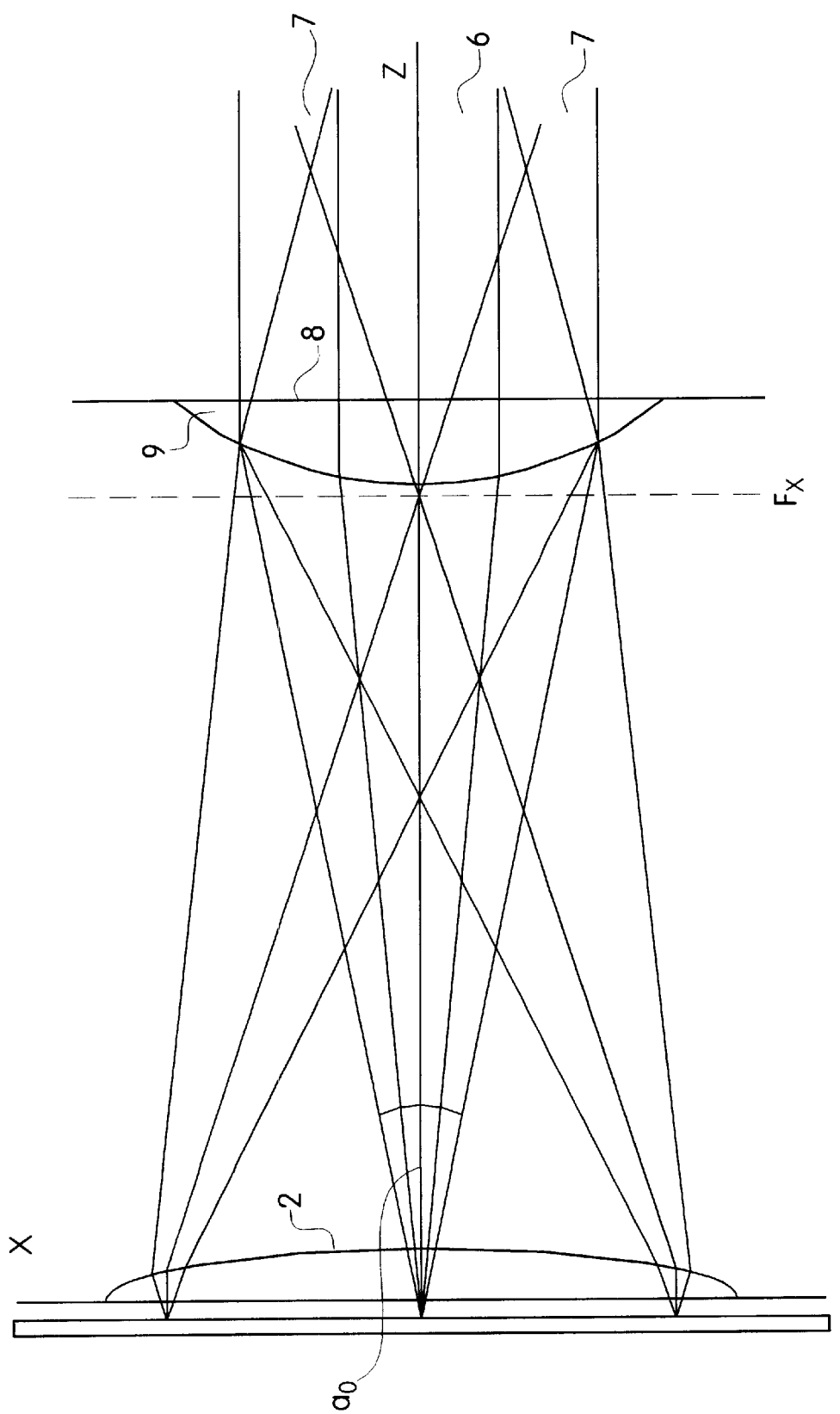
FIG. 2 shows the exemplary embodiment in the x–z section in an appropriately modified scale.
Figure 3:
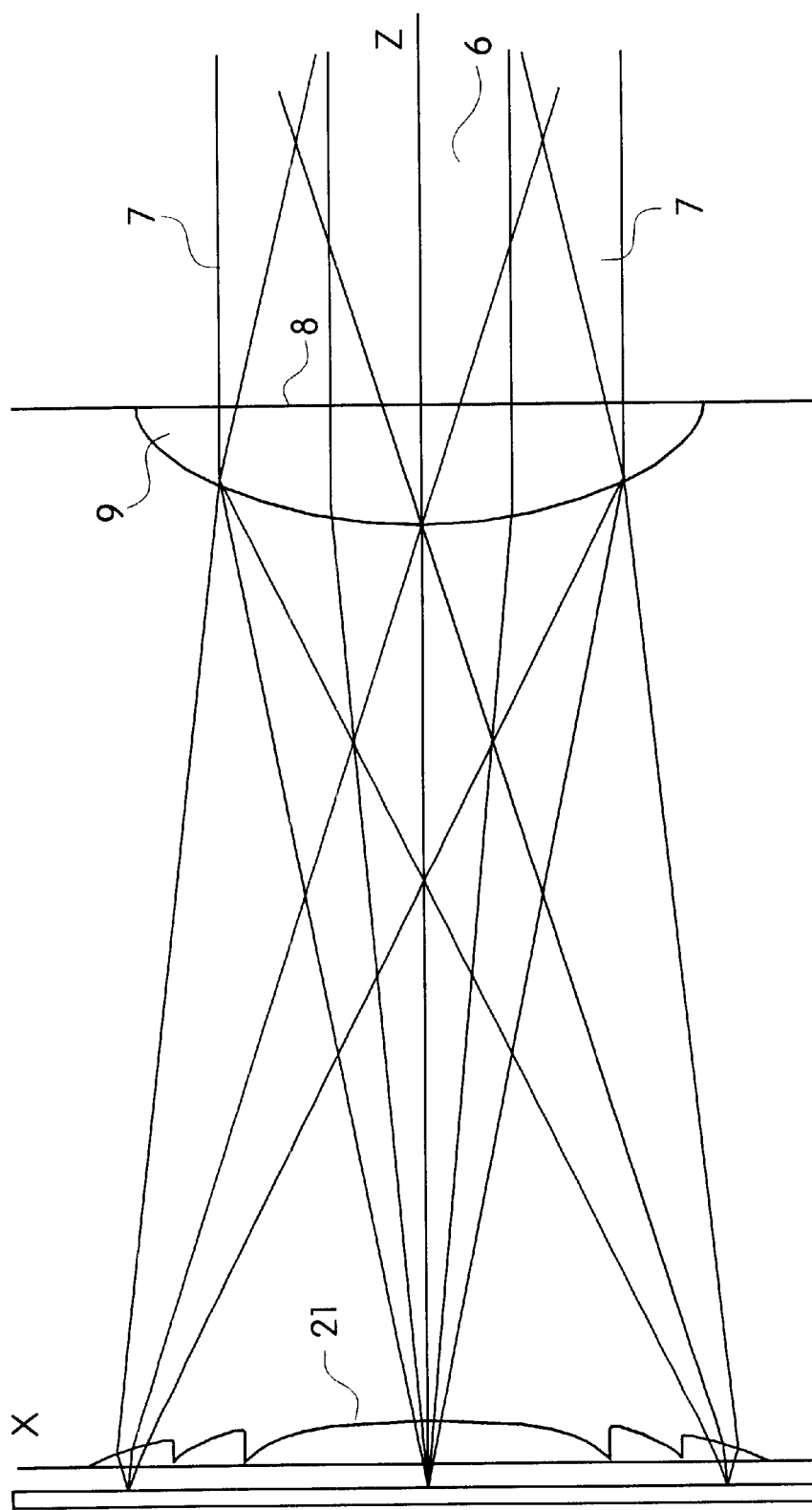
FIG. 3 shows another exemplary embodiment in the z–z section.

FIG. 2 shows the same exemplary embodiment in the x–z section. Mounted here on the output face of the laser is a lens having a long focal length in the x–z section or a Fresenl lens (in the case of the exemplary embodiment according to FIG. 3), by which the light of small aperture $a_0$ is focused onto lens y.

What is claimed is:

1. A device for optical coupling of a solid-state laser to an optical fiber, the device comprising an anamorphic lens system disposed between an output face of the solid-state laser and an input face of the optical fiber for converting differing apertures of the solid-state laser into essentially identical apertures at the input face, the lens system including an anamorphic first lens mounted on the output face and a second lens mounted on the input face.

2. The device as recited in claim 1 wherein the second lens is spherical.

3. The device as recited in claim 1 wherein the first lens is an aspherical lens.

4. The device as recited in claim 3 wherein the first lens is a Fresnel lens.

5. The device as recited in claim 1 wherein the first lens includes two crossed cylindrical partial lenses, at least one of the partial lenses being a Fresnel lens.

6. The device as recited in claim 1 further comprising a spacer layer disposed between the first lens and the output face, the spacer layer corresponding to a predetermined magnification in a direction of a larger aperture of the differing apertures.

7. A method of making a device for optical coupling of a solid-state laser to an optical fiber, the method comprising:
providing an anamorphic lens system disposed between an output face of the solid-state laser and an input face of the optical fiber for converting differing apertures of the solid-state laser into essentially identical apertures at the input face, the lens system including an anamorphic first lens mounted on the output face and a second lens mounted on the input face; and
producing the first and second lenses using a dry-resist technique.

8. The method as recited in claim 7 further comprising:
providing at least one spacer layer disposed between the first lens and the output face, the spacer layer corresponding to a predetermined magnification in a direction of a larger aperture of the differing apertures;
providing the anamorphic lens system with at least one antireflection layer; and
producing the at least one spacer layer and the at least one antireflection layer using the dry-resist technique.

9. A method of making a device for optical coupling of a solid-state laser to an optical fiber, the method comprising:
providing an anamorphic lens system disposed between an output face of the solid-state laser and an input face of the optical fiber for converting differing apertures in main sections of the solid-state laser into essentially identical apertures at the input face, the lens system including an anamorphic first lens mounted on the output face and a second lens mounted on the input face; and
producing the first and second lenses using additive lithography.

10. The method as recited in claim 9 wherein the additive lithography includes electron-beam lithography.

11. The method as recited in claim 7 further comprising producing the first and second lenses using additive lithography.

12. The method as recited in claim 11 wherein the additive lithography includes electron-beam lithography.

13. The method as recited in claim 7 further comprising:
providing at least one spacer layer disposed between the first lens and the output face, the spacer layer corresponding to a predetermined magnification in a direction of a larger aperture of the differing apertures;

providing the anamorphic lens system with at least one antireflection layer; and producing the at least one spacer layer and the at least one antireflection layer using additive lithography.

14. The method as recited in claim 9 further comprising:

providing at least one spacer layer disposed between the first lens and the output face, the spacer layer corresponding to a predetermined magnification in a direction of a larger aperture of the differing apertures;

providing the anamorphic lens system with at least one antireflection layer; and producing the at least one spacer layer and the at least one antireflection layer using additive lithography.

* * * * *